United States Patent [19]

Brauner et al.

[11] Patent Number: 4,655,342
[45] Date of Patent: Apr. 7, 1987

[54] DISC STORAGE CASE

[75] Inventors: William E. Brauner, Los Altos, Calif.; John G. Tomkinson, Seattle; Eivind Clausen, Bellingham, both of Wash.

[73] Assignee: Allsop, Inc., Bellingham, Wash.

[21] Appl. No.: 735,819

[22] Filed: May 17, 1985

[51] Int. Cl.⁴ ............................................. B65D 5/50
[52] U.S. Cl. .......................... 206/45.18; 206/45.13; 206/45.15; 206/425; 206/444; 206/472; 220/339
[58] Field of Search ............... 206/44 B, 45.13, 45.14, 206/45.16, 45.18, 45.20, 45.23, 45.24, 309, 387, 425, 444, 450, 472, 555, 556; 220/339

[56] References Cited

U.S. PATENT DOCUMENTS

| | | | |
|---|---|---|---|
| 1,375,794 | 4/1921 | McSheehy | 206/44 B |
| 1,839,902 | 1/1932 | Straubel | 206/44 B |
| 2,190,178 | 2/1940 | Wolters | 206/44 B |
| 4,091,918 | 5/1978 | Soulakis et al. . | |
| 4,225,038 | 9/1980 | Egly . | |
| 4,253,568 | 3/1981 | Cong et al. | 206/387 |
| 4,289,235 | 9/1981 | Egly | 206/387 |
| 4,325,595 | 4/1982 | Solomon . | |
| 4,356,918 | 11/1982 | Kahle et al. . | |
| 4,369,879 | 1/1983 | Egly et al. . | |
| 4,387,802 | 6/1983 | Shearing et al. . | |
| 4,410,216 | 8/1983 | Koch | 206/387 |
| 4,420,079 | 12/1983 | Gliniorz et al. | 206/387 |
| 4,449,628 | 5/1984 | Egly et al. . | |
| 4,478,335 | 10/1984 | Long et al. . | |
| 4,479,577 | 10/1984 | Eichner et al. . | |
| 4,496,050 | 1/1985 | Kirchner et al. . | |
| 4,508,217 | 4/1985 | Long et al. | 206/45.18 |
| 4,512,467 | 4/1985 | Knoblauch | 206/45.13 |
| 4,546,898 | 10/1985 | Ekuan | 206/444 |

Primary Examiner—Joseph Man-Fu Moy
Assistant Examiner—David T. Fidei
Attorney, Agent, or Firm—Hughes & Cassidy

[57] ABSTRACT

A case adapted to contain magnetic discs or the like, said case having a box-like containing member with a lid being hinge mounted to, and formed integrally with, the containing member. There is a tray to hold the discs in a displayed position where the tray slants upwardly and forwardly with the lid being fully opened. There is a linkage member comprising two linkage arms interconnecting the tray with the lid so as to cause upward motion of the tray. The tray further has a cam track and cam follower connection with the side walls of the case to program the motion of the tray to its proper display position.

13 Claims, 12 Drawing Figures

DISC STORAGE CASE

BACKGROUND OF THE INVENTION

1. Field of the Invention

The present invention relates to a case to store objects, such as magnetic discs, compact discs or the like, and more particularly to such a case which is able to contain the discs in a stored condition, and conveniently display the discs in a manner for easy accessibility, when the case is in its open position.

2. Background Art

In modern computing systems, generally a plurality of magnetic discs are utilized for storage and retrieval of information which is encoded on the discs. When the discs are not in use, these must be stored in a manner to protect the discs from damage, contamination, or other debris which could impair their proper operation. In addition to storing the discs safely, it is also desirable that the discs be readily available for selection, and also for easy insertion into and removal from the storage container.

A number of disc cases or containers have appeared in recent years, and in some of these, there is a box or base container having a lid which closes the top of the container. When the lid is raised to its open position, there is a tray or other locating member which slants upwardly and forwardly from the lid which is generally at a further rearward position. Thus, the discs can be moved angularly about their bottom edge portions forwardly and rearwardly between the upwardly and rearwardly slanting lid and the forward tray. This facilitates the insertion and removal of discs, as well as the inspection of the discs for selection.

A search of the patent literature has disclosed a number of disc storage devices, and these are discussed briefly below.

U.S. Pat. No. 4,496,050—Kirchner, et al, illustrates a storage container where there is a lid pivotally mounted to a box at a pivot location spaced moderately forwardly at the rear edge of the box. There is a tray having a rear edge that is hinge mounted to the extreme rear edge of the lid. This tray has a pair of pins spaced forwardly of the hinge connection, and these pins ride in slots or cam tracks formed in the sidewall of the box. These slots have a first arcuate section and an end section which is directed forwardly. These slots cooperate with the pins in a manner to program the motion of the tray. Thus, when the lid is lifted, toward the end of the lifting motion of the lid, the tray is moved outwardly from the lid to an upwardly and forwardly extending position where the discs are displayed generally in the manner noted above.

U.S. Pat. No. 4,479,577—Eichner, et al, discloses a disc storage container where there is a first outer rectangular mounting member in which is pivotally mounted a containing member. The containing member can be stowed within the outer rectangular member, or it can be swung outwardly to an access position where the discs are accessible.

U.S. Pat. No. 4,478,335—Long, et al, shows a storage container where the lid can be swung upwardly in a manner to display the discs somewhat in the same manner as the Kirchner et al patent. The lid is pivotally mounted in the box about a pivot location spaced moderately forwardly of the rear edge of the box. There is a disc holding tray which is pivotally connected to the lid, and when the lid is raised, the tray engages the box in a manner to cause the tray to tilt forwardly to its display position.

U.S. Pat. No. 4,449,628—Egly, shows a disc storage container where the discs are essentially stored in an area adjacent the lid, with the discs being held in place by a plate member attached directly to the lid.

U.S. Pat. No. 4,387,802—Shearing et al, shows a storage container where there is a plurality of containing members which can be lifted vertically from a base container. There is no lid member pivotally connected to the base container.

U.S. Pat. No. 4,369,879—Egly, shows generally the same sort of structure as in the above-mentioned Egly patent.

U.S. Pat. No. 4,356,918—Kahle, discloses a storage container where the lid is hinge mounted to the box, and the lid is provided with a member to contain the discs. The lid can be moved to an upright position, as shown in FIG. 1 of that patent, where it is upstanding from the box, and the containing area of the box faces upwardly. The lid can also be moved further rearwardly to the position of FIG. 3 of that patent, where the box is inverted and the lid rests on the bottom surface of the box which in that position is turned upwardly.

U.S. Pat. No. 4,325,595—Solomon, shows a card file where there is a pivotally mounted lid having the pivot locations at a lower portion of the box. The lid can be swung outwardly to a down position where it holds a positioning member 20 at the proper slant for appropriate display of the files.

U.S. Pat. No. 4,225,038—Egly, shows a disc storage case where the lid can be raised, and the tray moved upwardly where it is held in position by engaging the forward upwardly positioned edge of the lid.

U.S. Pat. No. 4,091,918—Soulakis, et al, shows a containing structure having a lid which swings upwardly in a manner to lift the tray to a sloping position.

While the prior art does show a variety of containing devices which can perform the physical function of containing the discs, and in some instances displaying the discs, there is a continuing need for improvement, with regard to such factors as simplicity of design, reliability and effectiveness of operation, and also convenience and economy of manufacture and assembly. Accordingly, it is an object of the present invention to provide a storage container having a desirable balance of such features.

SUMMARY OF THE INVENTION

The case of the present invention is adapted to contain objects, such as discs, with the case having a closed position where the objects are stored within the case, and an open position where the objects are located in an easily accessible position. The case comprises a base containing member having a front end portion, a rear end portion and two side portions. The lid has a rear end portion and a front end portion. The lid is mounted to said base member for angular movement between a down closed position and an open position about a swing axis adjacent the rear end portion of the base member.

There is a carrying and display assembly that comprises a tray and a linkage means. The tray is adapted to carry the objects and is mounted within the base member in a manner to be movable between a down closed position when said lid is closed, and an up display position when said lid is in its open position.

The linkage means is operatively connected to the tray in a manner to permit limited relative angular movement between the linkage means and the tray. Also, the linkage means is operatively connected to the lid in a manner that the angular motion of the lid causes a corresponding angular motion of the linkage means. The linkage means is further characterized in that the angular motion of the linkage means resulting from movement of the lid to its open position causes the linkage means to lift a forward portion of the tray to position the tray at its display position.

The carry and display assembly as an operative connection to the base member which is responsive to the angular motion of the linkage member causing movement of the tray to its display position in a manner that a forward component of motion is imparted to a rear portion of the tray to position the tray in its display position.

Desirably, the lid is hinge mounted at a rear edge portion of said containing member, and more desirably the lid is formed integrally with said containing member. Thus, there is a hinge connection between the lid and said containing member comprising flexible material.

In the preferred form, the linkage member has a first rear pivot connection to the rear portion of the tray, and a second operative connection to the tray at a location forwardly of the first pivot connection. This second operative connection permits limited relative angular movement between the lid and the tray about the first pivot connection.

In the preferred form, the linkage member has a forward end having a slide connection with the lid, whereby when the lid is moved angularly, relative motion is permitted between the lid and the forward end of the linkage member. In the preferred form, this second operative connection comprises pin and slot means, with a generally arcuate slot being formed in one of the linkage means and the tray.

Preferably, the operative connection of the carry and display assembly comprises cam track and cam follower means operatively connected between the tray and the containing member in a manner that relative rotational movement of the tray relative to the containing member causes the forward movement component of the tray. Desirably, the cam track of the cam track and cam follower means has an upward and forward alignment, so as to cause relative forward and upward movement of a portion of the tray at a location of the cam track and the cam follower means.

In the preferred form, the tray comprises a bottom wall, two side walls, and a rear wall. The side walls of the tray are positioned adjacent side walls of the container. The cam track is mounted to the side walls of one of the tray and the containing member, and the cam follower is mounted to another of the tray and the containing member. The cam track and the cam follower are arranged so that relative rotational movement between the tray and the containing member causes an upward and forward component of movement of the tray.

Also in the preferred form, the rear wall of the tray has, relative to the bottom wall of the tray, an upward and rearward slant when the bottom wall of the tray is in a horizontal position. The tray is arranged so that in its display position, the rear wall of the tray rests against a bottom wall of the containing member so that the bottom wall of the tray has an upward and forward slope when the tray is in its display position.

In the specific configuration of the present invention, the linkage means comprises two arms mounted on opposite sides of the case.

Other features of the present invention will become apparent from the following detailed description.

DESCRIPTION OF THE PREFERRED EMBODIMENT

The disc containing case 10 of the present invention comprises a box-like base container 12, a lid 14 hinge mounted to the base container 12, and a carrying and display assembly 16 which is arranged to position the contained discs in a convenient position for access when the lid 14 is in its fully opened position. This assembly 16 comprises a tray 18, and a linkage member 20 which is operatively connected between the tray 18 and the lid 14 so as to properly position the tray 18.

The base container 12 has the overall configuration of a rectangular prism and comprises a front wall 22, a rear wall 24, two side walls 26 and a bottom wall 28. The length and width dimensions of the base container 12 are approximately equal, while the height dimension is approximately 20% to 30% of the length or width dimension. Thus, when the discs (indicated in broken lines in FIG. 2 at 30) are in a generally upright displayed position, these extend well above the sidewalls 26.

The lid 14 has a main cover portion 32 extending over the top of the base container 12, and a downwardly extending peripheral lip 34 extending along the side and front edges of the cover 32. This lip 34 fits within the front wall 22 and the side walls 24. In addition, the forward side portions of the lip 34 are provided with two slideways or tracks 36 which cooperate with the linkage member 20 in a manner to be described hereinafter.

The extreme rear edge of the lid 14 is hinge mounted at 38 to the upper edge of the rear wall 24 of the base container 12. This is a "living" hinge, in that it is formed of a flexible material interconnecting the lid 14 and the rear wall 24. This hinge 38 can be formed quite conveniently by forming the base container 12 and the lid 14 as one integral plastic piece, with the thickness of the material at the hinge location 38 being made substantially thinner than the walls of the container 12 and also thinner than the structural components of the lid 14. One of the advantages of the present invention is that the components interact in such a manner so as to effectively accomplish the storage and access function of the case, while permitting the lid 14 to be mounted in this manner to the base container 12.

Figure 8:
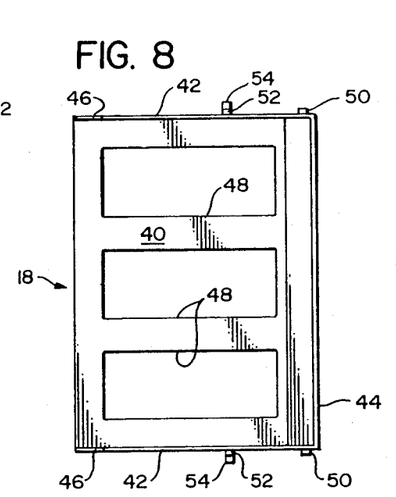
FIG. 8 is a top plan view of a tray of the present invention, shown separately from the rest of the components.
Figure 9:
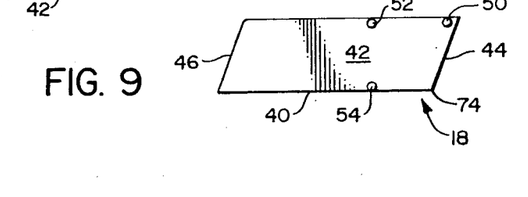
FIG. 9 is a side elevational view of the tray of FIG. 8.
Figure 10:
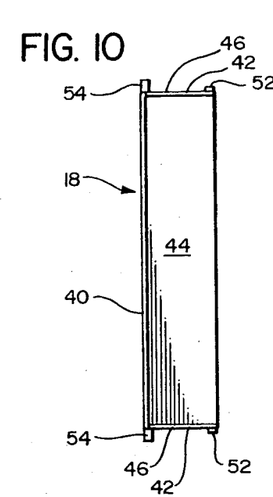
FIG. 10 is a front elevational view of the tray of FIGS. 8 and 9.

The tray 18 has an open trough-like configuration, and comprises a bottom wall 40, two side walls 42, and a rear wall 44. These walls 40-44 are generally planar, with the side walls 42 being perpendicular to the bottom wall 40. The rear wall 44 is slanted moderately from a perpendicular position relative to the bottom wall 40 in a manner that when the bottom wall 40 is positioned horizontally, the rear wall 44 extends upwardly and rearwardly at an angle of approximately 20°-25° from the vertical. Also, the forward edges 46 of the side walls 42 are shaped so as to be parallel to the plane of the rear wall 46. In the particular configuration shown herein, for manufacturing reasons the bottom wall 40 can be provided with a plurality of rectangular cutouts 48. (For convenience, these cutouts are shown only in FIG. 8.)

The tray 18 is provided with three pair of pin members 50-54, with each pair having the pins positioned oppositely from one another, with each being located on an outwardly facing surface of a related side wall. The pins 50 of the first pair are positioned each at an upper rear corner portion of its related sidewall 42. The pins 52 of a second pair are positioned at the same elevation as the pins 50, but are located forwardly therefrom, again with each pin 52 extending laterally outwardly from its related side wall 42. The pins 54 of the third pair are positioned directly beneath the pins 52, adjacent the lower edges of the side walls 42. The function of these pins 50-54 is to locate the tray 18 in movement between its stowed and its display position, and the manner in which this is accomplished will be described later herein.

Figure 11:
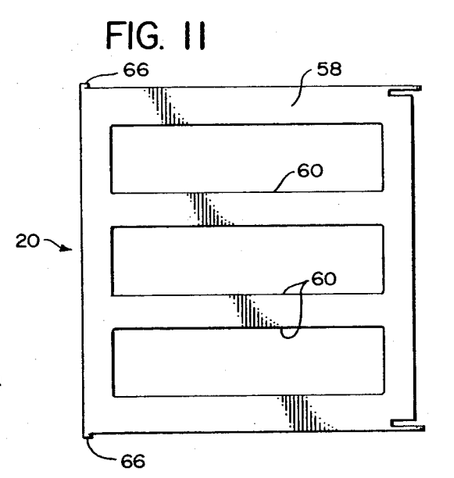
FIG. 11 is a top plan view of a linkage member of the present invention, shown separately from the other components.
Figure 12:
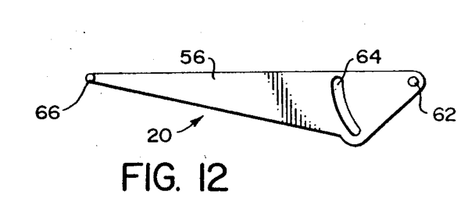
FIG. 12 is a side elevational view of the linkage member of FIG. 11.

The linkage member 20 is a unitary member and comprises two linkage arms 56, interconnected by a back-plate 58. This plate 58 can be made with cutouts, such as the rectangular cutouts shown at 60. (For convenience, these cutouts 60 are shown only in FIG. 11.) The upper rear end portion of each linkage arm 56 is provided with a laterally oriented hole 62 to receive a related pin 50 from the tray 18. This pin/hole connection 50-62 forms a hinge or pivot axis about which the tray 18 rotates relative to the linkage member 20.

Each linkage arm 56 is formed with an arcuate slot 64 having its center of curvature at the location of its related hole or opening 62. The slot 64 of each arm 56 receives a related pin 52, in a manner that each pin 52 can travel the length of its related slot 64. The pin hole connection 50-62 and the pin slot connection 52-64 provide an operative connection between the linkage member 20 and the tray 18 so as to permit limited angular movement therebetween with the center of rotation being at the location of the holes 62, and the limit of relative angular rotation being determined by the length and location of the arcuate slots 64. In the preferred embodiment, the limit of this relative rotation is between about 40°-45°.

The extreme forward end of each linkage arm 56 is provided with a laterally and outwardly extending pin 66, each of which tracks or rides in a related one of the slideways 36 formed along the forward edge portions of the lid 14. The rear edge of the plate 58 is formed with a short downturned lip 68.

The inner surface of each side wall 26 of the base container 12 is formed with a cam slot 70 which receives a related one of the aforementioned pins 54. These cam slots 70 are each formed as a slideway enclosed by a periperal lip 72. These lips 72 are positioned so that the linkage arms 56 can pass freely by the lips 72. Further, the pins 54 extend outwardly a short distance further than the pins 52 so that these pins 54 can properly engage the cam slots 70.

In the particular configuration shown herein, each cam slot 70 is formed in a curve which has a greater vertical component at a lower rear location and then curves upwardly and then forwardly to end in a more horizontal direction with only a moderate upward slant. These cam slots 70 are programmed to accomplish the proper movement of the tray 18 in a manner to be discribed hereinafter.

To describe the operation of the present invention, reference will now be made to FIGS. 3-6 which show the components of the case 12 in various positions from the fully closed position of FIG. 3 to the fully opened position of FIG. 6.

Figure 3:
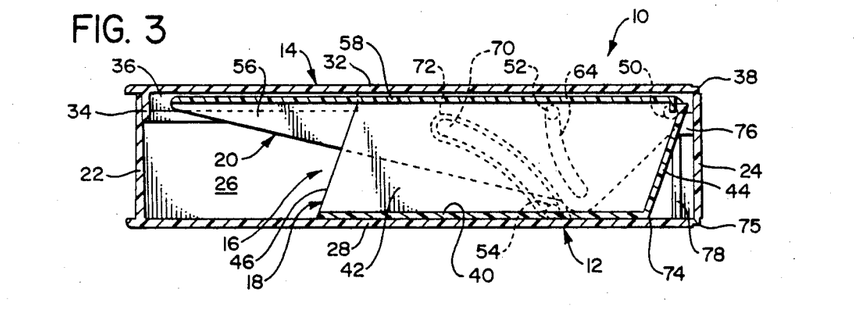
FIG. 3 is a sectional view taken along line 3—3 of FIG. 1, and showing the case in its closed position.
Figure 4:
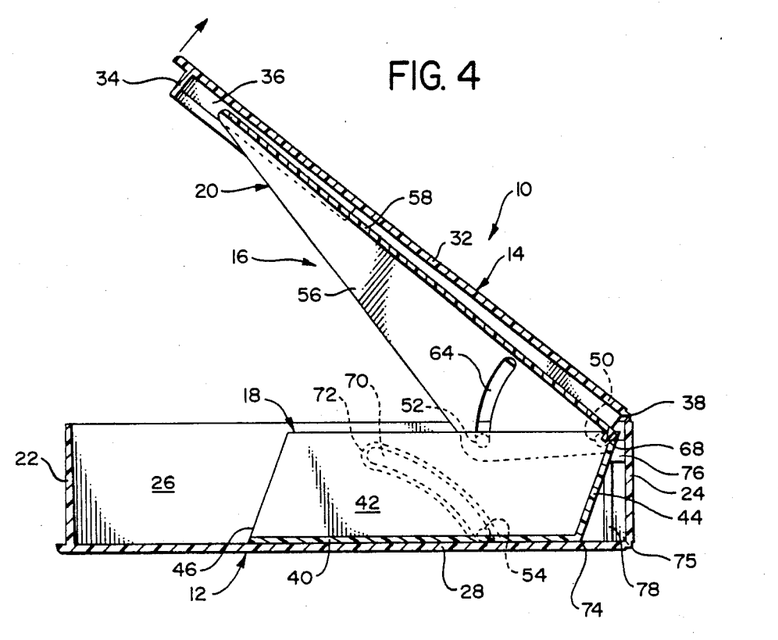
FIG. 4 is a view taken along the same line as FIG. 3, and showing the case where the lid has been moved upwardly to an intermediate position.
Figure 5:
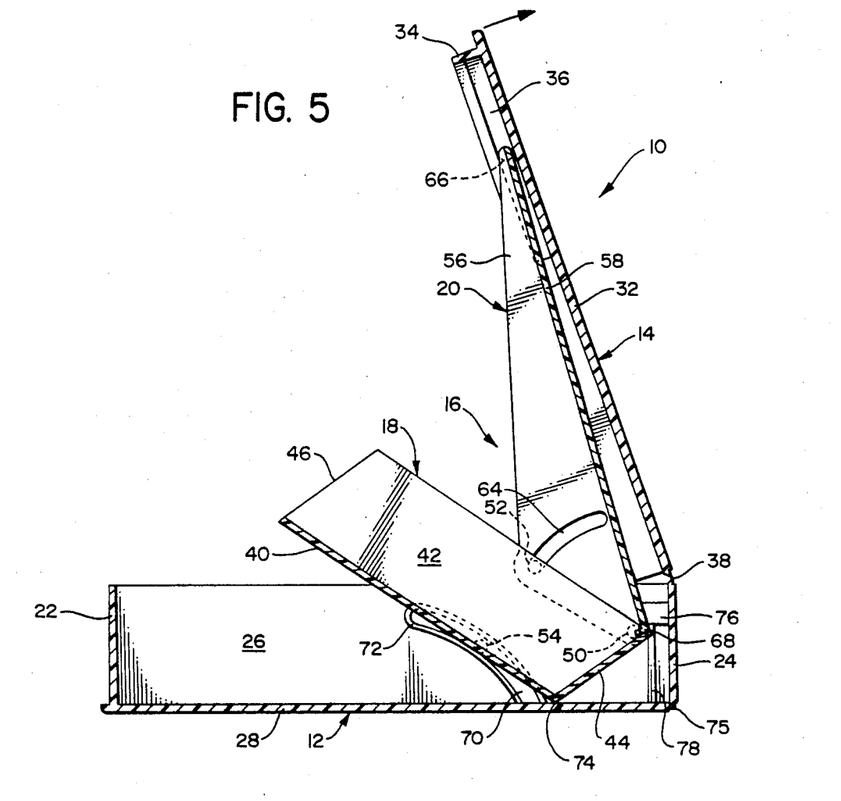
FIG. 5 is a view similar to FIGS. 3 and 4, but showing the lid being moved further upwardly and rearwardly relative to the position of FIG. 4, and with the tray being moved partially toward its display position.

In the fully closed position of FIG. 3, the bottom wall 40 of the tray 18 rests on the bottom wall 28 of the base container 12. The linkage member 20 is positioned just below the lid 14, and rests on the top edges of the side arms 42 of the tray 18. The two pins 52 are positioned at uppermost locations in their respective arcuate slots 64. The two pins 54 are positioned in the lowermost rear locations of their related cam slots 70. In the position of FIG. 3, the case 10 completely encloses the contained discs 30.

To open the case 10, the front edge of the lid 14 is grasped and swung upwardly in an arcuate path about the hinge axis 38. Because of the connection of the forward pins 66 in the slideways 36, there is a corresponding upward angular movement of the linkage member 20, with the center of rotation during this portion of movement being about the pin/hole connection 50-62. When the lid 14 reaches the position of FIG. 4 (which it occurs at approximately 40° rotation of the lid 14), the two pins 52 are positioned at the lowermost edge of the related locating slots 64.

Further rotation of the lid 14 causes a further corresponding rotation of the linkage member 20. Since the pins 52 are in the position of FIG. 4 at the uppermost location of the related slot 64, the further upward and rearward angular movement of the linkage member 26 causes a corresponding upward angular movement of the tray 18. This causes the tray 18 to begin to pivot about its lower rear edge 74 (which is formed by the juncture of the bottom wall 40 and the rear wall 44) so that the two pins 54 are caused to move upwardly. Since the pins 54 are positioned in the cam tracks 70, the pins 54 travel in an initial upward and forward path dictated by the tracks 70. This adds a component of forward motion to the lower rear edge portion 74 of the tray 18.

Figure 6:
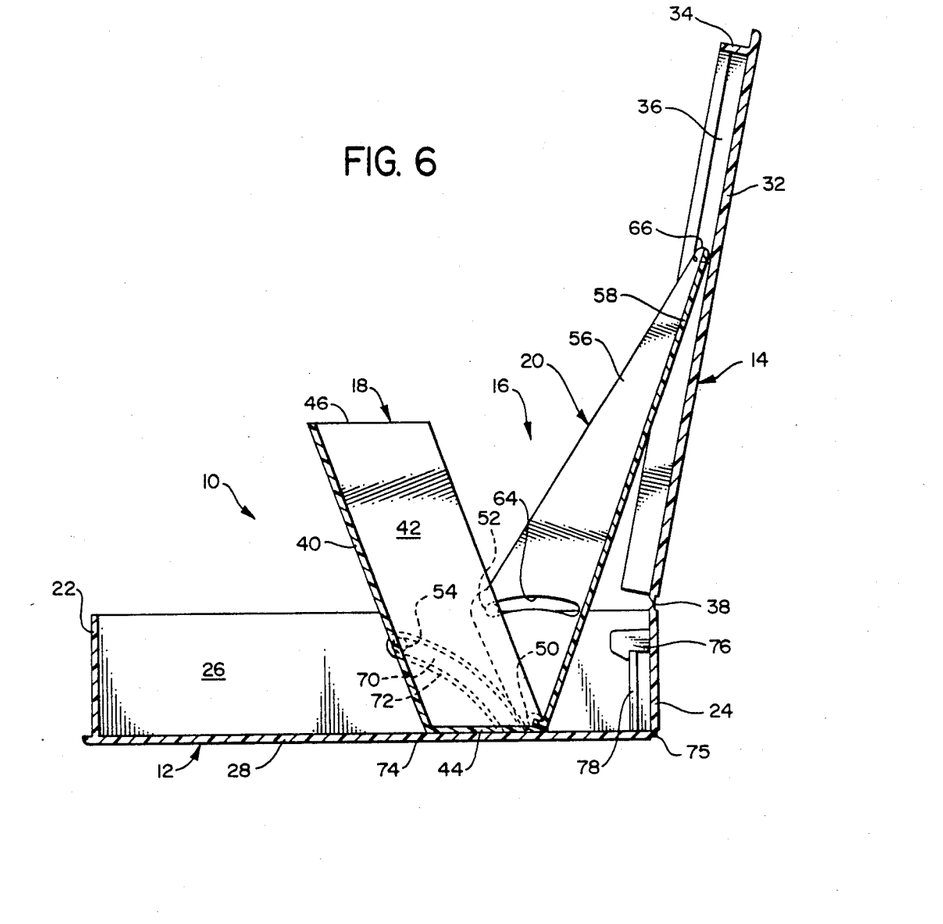
FIG. 6 is a view similar to FIGS. 3-5, but showing the lid in its fully opened position, and the tray in its display position.

As the lid 14 is rotated further, it eventually reaches the full open position of FIG. 6, where it extends upwardly with a moderate forward slant. It will be noted that during movement of the lid 14 from the position of FIG. 4, through the position of FIG. 5 to the position of FIG. 6, the linkage member 20 and the tray 18 have no relative movement between one another, but rather move essentially as a single unitary member. During this phase of movement, the positioning of the tray 18 is controlled by the pins 54 moving in the cam slots 70, the engagement of the rear lower edge 74 with the bottom container wall 28, and the movement of the linkage arm pins 66 within the slideways or slots 36 formed in the lid 14.

When the lid 14 is moved to the fully opened position of FIG. 6, the tray 18 is positioned so that its rear wall 44 is horizontal and lies against the bottom wall 28 of the base container 12. The two pins 54 are positioned at the forwardmost location of the two slots 70. Because of the slope of the rear wall 44, the bottom wall 40 in the position of FIG. 6 extends essentially upwardly with a moderate forward slant. Further, the plate 58 of the linkage member 20 extends upwardly with a moderate rearward slant.

Figure 1:
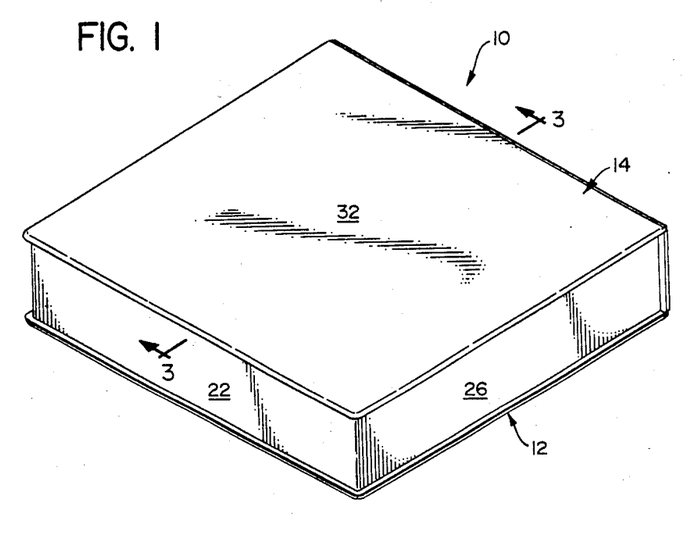
FIG. 1 is an isometric view of the case of the present invention in its closed position.
Figure 2:
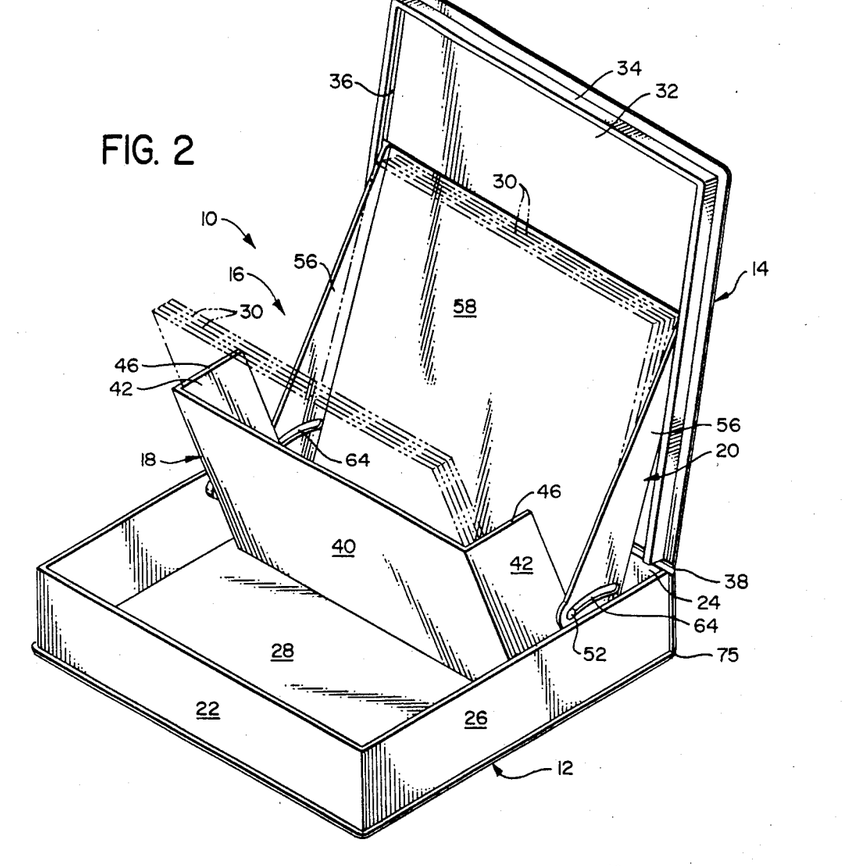
FIG. 2 is an isometric view taken from the same location as FIG. 1, but showing the case in its open position.

It can readily be seen by an examination of FIG. 2 that in the fully opened position the discs 30 are conveniently positioned for easy access. The lower edges of the discs 30 are positioned between the lower portions of the wall 40 of the tray 18 and the plate 58 of the linkage member 20. Since the wall 40 and the plate 58 extend upwardly and divergently from one another, the upper portions of the discs 30 have relative freedom in being moved from a forward position to a more rearward position, as illustrated in FIG. 2. Thus, the discs 30 can easily be examined, and they can easily be inserted into, or removed from, the case 10 at selected locations.

Figure 7:
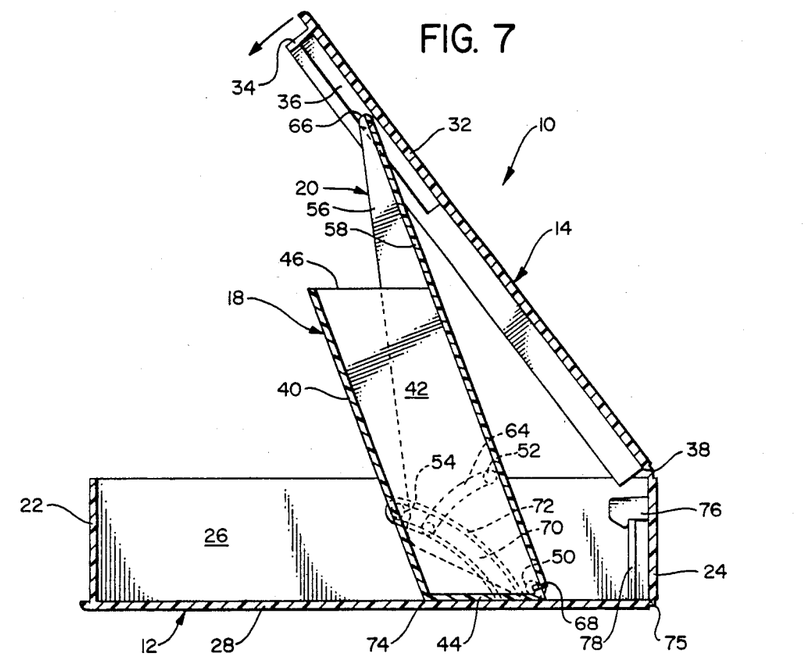
FIG. 7 is a view similar to FIGS. 3-6, but showing the lid being moved downwardly to a position where it begins to move the tray back to its storage position.

To close the lid 14, the lid 14 is moved forwardly and then downwardly about the hinge axis 38. The movements of the components of the case 10 are generally in reverse to those described previously relative to the opening of the lid 14 to the fully opened position of FIG. 6. In FIG. 7, the lid 14 is shown moved downwardly in a manner that the two pins 52 have moved to the extreme lower edge portions of the two slots 64. Further downward movement of the lid 14 causes the tray 18 to rotate downwardly, with the pins 54 traveling rearwardly in the cam slots 70 in a manner to add a rearward component of motion to the movement of the tray 18. When the lid 14 finally reaches its fully closed position of FIG. 3, all of the components are returned to the positions indicated in FIG. 3.

An examination of the main components of the present invention will make it readily apparent that these lend themselves to effective and relatively economical manufacturing processes. For example, the lid 14 and base container 12 can be formed from plastic as a unitary member. Further, the tray 18 and the linkage member 20 each lend themselves to manufacture as integral components made from plastic.

With regard to the formation of the base container 12, another advantage of the present invention is that it is quite convenient to manufacture the box 12 by providing a second living hinge 74 at the juncture of the rear wall 24 and the bottom wall 28. Further, the rear wall 24 is formed with one or more catch elements 76 which engage an upstanding member 78 mounted to the bottom wall 28. Engagement of the catch element 76 with the member 78 hold the rear wall 24 in place.

It is to be understood that various modifications could be made to the present invention without departing from the spirit and scope of the present invention.

We claim:

1. A case adapted to contain objects, such as discs, said case having a closed position where said objects are stored within the case, and an open position where the objects are located in an easily accessible position, said case comprising:
   a. a base containing member having a front end portion, a rear end portion, two side portions, and a bottom wall;
   b. a lid having a rear end portion and a front end portion, said lid being hinge mounted by the rear end portion of the lid to the rear end portion of the base containing member, for angular movement between a down closed position and an open position;
   c. a carrying and display assembly comprising:
      1. a tray which is adapted to carry said objects and which has a rear tray portion and a forward tray portion and comprises a bottom wall means, rear wall means, and two side wall means, said tray being movable between a stowed position where, with the lid closed, said tray is positioned within said base member, and a display position where said tray extends upwardly from said base member and a front portion of said tray is positioned above said base member;
      2. a linkage means having a front end and a rear end, said front end being connected to said lid and movable therewith in a manner that upward angular motion of the lid causes a corresponding upward angular motion of the linkage means, said rear end having an operative connection to the rear portion of the tray which permits relative angular motion about an axis adjacent the rear portion of the tray and comprises limiting means which limits said relative angular motion between the tray and the linkage means within predetermined limits;
   d. said carrying and display assembly having a rear bearing portion which, in movement of the tray from said stowed position to said display position, bears against, and obtains support from, the bottom wall of the base member;
   e. said tray and said side walls of the base containing member having an operative cam follower and cam track connection, which is responsive to angular motions of the tray relative to the base containing member in a manner to impart to the rear portion of the tray a forward component of motion as the forward portion of the tray is rotated upwardly relative to the base containing member.

2. The case as recited in claim 1, wherein a rear edge of said lid is hinge mounted at an upper rear edge portion of said base containing member.

3. The case as recited in claim 2, wherein said lid is formed integrally with said containing member, in a manner that there is a hinge connection between said lid and said base containing member comprising a flexible material.

4. The case as recited in claim 3, wherein the forward end portion of the linkage means has a slide connection with the lid, whereby when said lid is moved angularly, relative motion is permitted between the lid and the forward end of the linkage member.

5. The case as recited in claim 4, wherein said linkage means comprises a pair of arms, positioned on opposite sides of said case, each of said arms having a forward end and a rear end, the forward ends of the arms being operatively connected to the front end portions of the lid, so as to be movable therewith, the rear ends of the arms being pivotally connected to rear end portions of the tray.

6. The case as recited in claim 5, wherein said limiting means which limits said relative angular motion between the tray and the linkage means comprises pin and slot means, with a generally arcuate slot being formed in each of said arms.

7. The case as recited in claim 1, wherein a cam track of said cam track and cam follower means has an upward and forward alignment, so as to cause relative forward and upward movement of a portion of said tray at a location of said cam track and cam follower means.

8. The case as recited in claim 7, wherein the rear wall means of the tray has, relative to the bottom wall means of the tray, an upward and rearward slant when the bottom wall means of the tray is in a horizontal position, said tray being arranged so that in its display position, said rear wall means of the tray rests against the bottom wall of the containing base member so that the bottom wall means of the tray has an upward and forward slope when the tray is in its display position.

9. The case as recited in claim 1, wherein the forward end portion of the linkage means has a slide connection with the lid, whereby when said lid is moved angularly, relative motion is permitted between the lid and the forward end of the linkage member.

10. The case as recited in claim 9, wherein said linkage means comprises a pair of arms, positioned on opposite sides of said case, each of said arms having a forward end and a rear end, the forward ends of the arms being operatively connected to the front end portions of the lid, so as to be movable therewith, the rear ends of the arms being pivotally connected to rear end portions of the tray.

11. The case as recited in claim 10, wherein said limiting means which limits said relative angular motion between the tray and the linkage means comprises pin and slot means, with a generally arcuate slot being formed in each of said arms.

12. The case as recited in claim 1, wherein:
 a. a rear edge of said lid is hinge mounted at an upper rear edge portion of said base containing member;
 b. the forward end portion of the linkage means has a slide connection with the lid, whereby when said lid is moved angulary, relative motion is permitted between the lid and the forward end of the linkage member;
 c. a cam track of said cam track and cam follower means has an upward and forward alignment, so as to cause relative forward and upward movement of a portion of said tray at a location of said cam track and cam follower means;
 d. the forward end portion of the linkage means has a slide connection with the lid, whereby when said lid is moved angularly, relative motion is permitted between the lid and the forward end of the linkage member.

13. The case as recited in claim 12, wherein:
 a. said lid is formed integrally with said containing member, in a manner that there is a hinge connection between said lid and said base containing member comprising a flexible material;
 b. said linkage means comprises a pair of arms, positioned on opposite sides of said case, each of said arms having a forward end and a rear end, the forward ends of the arms being operatively connected to the front end portions of the lid, so as to be movable therewith, the rear ends of the arms being pivotally connected to rear end portions of the tray;
 c. said limiting means which limits said relative angular motion between the tray and the linkage means comprises pin and slot means, with a generally arcuate slot being formed in each of said arm.

* * * * *